United States Patent
Xiao et al.

(10) Patent No.: US 10,706,451 B2
(45) Date of Patent: Jul. 7, 2020

(54) INTELLIGENT MARKET AUTOMATIC CLEARING SYSTEM AND IMPLEMENTATION METHOD THEREFOF

(71) Applicant: Dan Xiao, Shenzhen, Guangdong (CN)

(72) Inventors: Dan Xiao, Guangdong (CN); Guangtao Niu, Guangdong (CN); Yuanming Xiao, Guangdong (CN); Yan Huang, Guangdong (CN); Xiaoyu Wang, Guangdong (CN)

(73) Assignee: Dan Xiao (CN)

( * ) Notice: Subject to any disclaimer, the term of this patent is extended or adjusted under 35 U.S.C. 154(b) by 352 days.

(21) Appl. No.: 15/304,054

(22) PCT Filed: Apr. 3, 2015

(86) PCT No.: PCT/CN2015/075878
§ 371 (c)(1),
(2) Date: Oct. 13, 2016

(87) PCT Pub. No.: WO2016/078289
PCT Pub. Date: May 26, 2016

(65) Prior Publication Data
US 2017/0046767 A1 Feb. 16, 2017

(30) Foreign Application Priority Data
Nov. 19, 2014 (CN) .......................... 2014 1 0660481

(51) Int. Cl.
*G06Q 30/00* (2012.01)
*G06Q 30/06* (2012.01)
(Continued)

(52) U.S. Cl.
CPC ..... *G06Q 30/0627* (2013.01); *G06K 7/10297* (2013.01); *G06K 7/10712* (2013.01);
(Continued)

(58) Field of Classification Search
CPC ................ G06Q 30/0627; G06Q 30/06–08
(Continued)

(56) References Cited

U.S. PATENT DOCUMENTS 6,725,206 B1 * 4/2004 Coveley .................. A47F 9/048
177/17
2006/0293968 A1 * 12/2006 Brice .................... B62B 3/1424
705/14.63
(Continued)

FOREIGN PATENT DOCUMENTS

CN 102663638 A 9/2012
CN 203941580 U 11/2014
(Continued)

*Primary Examiner* — Ethan D Civan

(57) ABSTRACT

The present invention relates to an intelligent market automatic clearing system comprises a device part and a system part, wherein the device part comprises commodity electronic price tags, a self-service weighing apparatus, a shopping ring, a mobile phone, a shopping basket and a market automatic clearing device. The system part comprises intelligent market automatic clearing APP software, an intelligent market clearing system and an intelligent market clearing system data cloud service platform. The market automatic clearing device comprises a shopping basket moving frame, a visual recognition apparatus, a mechanical commodity picking apparatus, a bar code and RFID recognition apparatus table, an anti-theft decoding apparatus, a mechanical packaging apparatus table, a clearing table, an anti-theft detection door and an automatic channel door.

9 Claims, 13 Drawing Sheets

(51) Int. Cl.
    *G06Q 20/32*     (2012.01)
    *G07G 1/00*      (2006.01)
    *G06Q 20/02*     (2012.01)
    *G06K 7/10*      (2006.01)
    *H04L 29/08*     (2006.01)

(52) U.S. Cl.
    CPC ....... *G06Q 20/023* (2013.01); *G06Q 20/3224* (2013.01); *G06Q 20/3276* (2013.01); *G06Q 20/3278* (2013.01); *G06Q 30/0629* (2013.01); *G06Q 30/0633* (2013.01); *G06Q 30/0641* (2013.01); *G07G 1/0045* (2013.01); *H04L 67/10* (2013.01)

(58) Field of Classification Search
    USPC .................. 706/26.63; 705/26.63, 26.1–27.2
    See application file for complete search history.

(56) References Cited

U.S. PATENT DOCUMENTS

2010/0136918 A1* 6/2010 Bonner .................. H04W 4/02
                                              455/66.1
2011/0006742 A1* 1/2011 Teggatz .................. H02J 7/35
                                              323/234

FOREIGN PATENT DOCUMENTS

| CN | 104361693 A | 2/2015 |
| CN | 204204128 U | 3/2015 |
| EP | 2381409 A3  | 10/2012 |

\* cited by examiner

| Merchant | | | Location | | |
|---|---|---|---|---|---|
| Photo | Name | Price | Quantity | Discount | Sum |
| | Nescafe | 29.80 | 2 | 1.0 | 29.60 |
| | | | | | |
| Sum | | | | | 59.60 |

Shopping Guide | Commodity | My | Clearing

INTELLIGENT MARKET AUTOMATIC CLEARING SYSTEM AND IMPLEMENTATION METHOD THEREFOF

TECHNICAL FIELD OF THE INVENTION

The present invention relates to the technical field of automatic clearing systems, and more particularly, to an intelligent market automatic clearing system and a method for implementing the same.

BACKGROUND OF THE INVENTION

With the rapid development and improvement of mobile internet and internet of things ("IoT"), new shopping modes like online shopping and TV shopping have become ubiquitous. However, traditional mall and supermarket shopping still play an important role in daily life due to the advantages of directness and convenience.

Although the prior shopping modes are universally welcomed, they also have the following shortcomings:

Along the continuous expansion of shopping malls and supermarkets, shoppers and administrators still face several inconveniences and discomforts. For instance, the shopping area is too big for a shopper to find what he wants or learn the details about the items efficiently; and, long lines at the shopping mall create frustration and a waste of time. Rather than wait in long lines to purchase their items, many shoppers may simply decide not to purchase any items, bringing economic loss and operating pressure to the shopping malls and supermarkets.

The patent CN103136879A discloses an intelligent restaurant checkout counter, which has no application outside the restaurant context because all of the plates and commodities need to be electronically tagged. For increasing the using cost of each commodity in the supermarket, this solution obviously cannot be applicable for all commodities. Although the cost of an electronic tag can be ignored for those high-valued commodities, many supermarkets inevitably sell some low-valued commodities, for which the cost of an electronic tag simply cannot be ignored. Additionally, the difficult reutilization of the electronic tags is also an unacceptable expenditure for both the manufactures and the merchants. To manufacturers, it means not only the cost of the electronic tags, but also an improvement of the related manufacturing process. Further, the patent CN102708489A disclosed an intelligent supermarket shopping system based fusing RFID and 3G technologies, which also fails to verify each shopper's behavior. Consequently, the shopper's purchasing power is not optimized. Meanwhile, this shopping system requires each shopping cart to be equipped with an intelligent terminal, resulting in a difficult engineering implementation.

In conclusion, the shopping environment of the traditional shopping malls and supermarkets are low-efficient, and the new shopping modes can severely impact the traditional ones if the shortcomings in the prior art cannot be overcome.

SUMMARY OF THE INVENTION

The purpose of the present invention is to overcome the shortcomings in the prior art and provide an intelligent market automatic clearing system and an implementation method thereof.

To achieve the above purpose, the present invention adopts the following technical solution:

An intelligent market automatic clearing system comprising a device part and a system part.

The device part comprises commodity electronic price tags, a self-service weighing apparatus, a shopping finger ring, a mobile phone, a shopping basket and a market automatic clearing device. The system part comprises intelligent market automatic clearing APP software, an intelligent market clearing system and an intelligent market clearing system data cloud service platform. The market automatic clearing device comprises a shopping basket moving frame, a visual recognition apparatus, a mechanical commodity picking apparatus, a barcode and RFID recognition apparatus table, an anti-theft decoding apparatus, a mechanical packaging apparatus table, a clearing table, an anti-theft detection door and an automatic channel door.

The commodity electronic price tags are used to replace the traditional pricing tags. A RFID near field communication electronic chip is disposed in the electronic price tag, allowing the information related to the commodity, including the manufacture, date of production, bar code, ingredients and price to be written into the electronic chip. Moreover, the electronic chip can exchange information with a mobile phone running the intelligent market self-service clearing system APP software.

The mobile phone is the shopper's smartphone, having the functions of wireless near field communication, NFC communication, Bluetooth communication or WI-FI communication.

The shopping finger ring is a device provided by the market to assist the shopper with self-service shopping. The shopping finger ring can acquire the information of commodities selected by the shopper and the shopper's location data, and transmit the information of commodities to the intelligent market automatic clearing APP software running in the shopper's smart phone.

The self-service weighing apparatus allows the shopper to weigh the selected commodities by the shopper's self and print the barcode receipts that need to be attached on the commodities. Additionally, the weighing apparatus can also exchange information with the shopper's smartphone running the intelligent market self-service clearing system APP software.

A plurality of visual recognition apparatuses is disposed in the shopping basket, which can rapidly and precisely locate the commodities in the shopping basket and calculate the recognition feature points of the commodity's outline.

The shopping basket is disposed on the shopping basket moving frame. A vertical moving shaft and a horizontal moving shaft are disposed on the shopping basket moving frame, propelling the shopping basket to move vertically and horizontally.

The mechanical commodity picking apparatus comprises a mechanical picking arm and a mechanical picking hand. The mechanical picking arm can move horizontally and vertically, enabling the mechanical picking hand to grab the commodities in the shopping basket, and place the commodities onto the barcode and RFID recognition apparatus table. The mechanical picking hand, which is disposed in the mechanical picking arm for grabbing a commodity, can be switched on and off. The terminal of the mechanical picking hand is provided with a touch sensor, a suction cup and a plurality of mechanical picking fingers, wherein the touch sensor can recognize a commodity and the suction cup can reliably grab a commodity, and the plurality of mechanical picking fingers can be used to flexibly coordinate the grabbing motions.

The visual recognition apparatus can scan the commodities in the shopping basket, and the laser and radar location can be combined to calculate the shape and the location of each commodity according to the scan results. Consequently, the shopping basket moving frame and the mechanical picking arm can be instructed to move correspondingly.

A plurality of 360 degree omni-directional scanners is disposed on the barcode and RFID recognition apparatus table for scanning the barcode information of the commodities placed thereon. The barcode and RFID recognition apparatus table is a transparent body, which is convenient for a scanner to scan the barcodes. An electronic scale is disposed on the barcode and RFID recognition apparatus table, which can compare the weight of a commodity with that corresponding to the barcode in the system to further verify the commodity. A RFID reader is disposed on the barcode and RFID recognition apparatus table for automatically recognizing the commodity having a RFID tag.

The anti-theft decoding apparatus, which is disposed on the barcode and RFID recognition apparatus table, decodes the commodity having an anti-theft tag.

The mechanical packaging apparatus table comprises a mechanical packaging arm, a packaging mechanical hand and a packaging table. The mechanical packaging arm can move horizontally and vertically, allowing the mechanical packaging hand to grab the commodities placed on the barcode and RFID recognition apparatus table, and further place them into a shopping bag on the packaging table. The mechanical packaging hand, which is disposed in the mechanical packaging arm for grabbing a commodity, can be switched on and off. A touch sensor, a suction cup and a plurality of mechanical packaging fingers are disposed in the terminal of the mechanical packaging hand, wherein the touch sensor can perceive a commodity and the suction cup can reliably grab a commodity, and the mechanical packaging fingers can flexibly coordinate the grabbing motions. The packaging table is for placing the shopping bags and packaging the commodities purchased by the shopper.

The clearing table comprises a clearing charge apparatus and a self-service cash receiver, which can verify the clearing information with the intelligent market automatic clearing APP software through the non-contact NFC technology, Bluetooth WI-FI communication technology, or human communication technology. The shopper can pay the selected commodities by bankcard or membership card through the clearing charge apparatus, pay cash through the self-service cash receiver, or pay on-line.

The anti-theft detection door, which is disposed at the location of the automatic channel door near the automatic clearing table, is used to detect or alarm the store attendant when the system identifies unpaid commodities. The automatic channel door can open automatically when the selected commodities are successfully paid.

Additionally, the intelligent market automatic clearing APP software can be connected to the market's WI-FI location, Bluetooth location or UWB location through the shopper's smartphone or shopping finger ring so as to guide and service the shopper. According to the APP software, information of the shopper's location and the commodities purchased by the shopper can be acquired and recorded, and the purchased commodities can be cleared online. This arrangement allows the shopper to trace the information of the purchased commodities, compare the prices online, and check reviews of other shoppers. Further, the intelligent market automatic clearing APP software can accept online payment, credit card payment, cash payment or membership card quick payment according to the electronic shopping list generated by the software.

The intelligent market clearing system can exchange data with the intelligent market automatic clearing APP software and the intelligent market clearing system date cloud service platform, enabling the information of the selected commodities and the clearing information to be automatically verified. As well, a control instruction can be sent correspondingly.

The intelligent market clearing system data cloud service platform can record the information of all commodities for sale in the system, exchanging data with the intelligent market automatic clearing APP software running in the shopper's smartphone in a real-time. It can also exchange data with the intelligent market clearing system in real-time and check, record and analyze the shopper's shopping behavior.

In another aspect of the present invention, the intelligent market clearing system software comprises a visual recognition module, a picking control module, a commodity verifying module, a packaging control module, a clearing module and a printing module.

Relying on the image recognition technology, the commodities in the shopping basket can be fuzzily recognized by the visual recognition module and compared with the model base in the system. Consequently, the overall physical dimension and the grabbing parameter of a commodity placed on the top layer of the shopping basket can be evaluated, and the clearing system can be prompted to instruct the mechanical picking apparatus to grab the commodity.

The picking control module is used to control the shopping basket moving frame, the mechanical picking apparatus, the mechanical picking arm and the mechanical picking hand to move to the position of a commodity. Through recognizing the information from the touch sensor disposed in the mechanical picking hand, the mechanical picking hand can be controlled to precisely grab a commodity and place the commodity on the barcode and RFID recognition apparatus table.

The commodity verifying module can record the commodities placed in the barcode and RFID recognition apparatus area, and exchange data with the intelligent market automatic clearing APP software running in the shopper's smartphone, acquiring the details of commodities purchased by the shopper and verifying the purchased commodities.

The packaging control module is used to control the mechanical packaging apparatus table, and instruct the mechanical packaging arm and the mechanical packaging hand to move to the position of a commodity placed on the barcode and RFID recognition apparatus table. By recognizing the information from the touch sensor disposed in the mechanical packaging hand, the mechanical packaging hand can precisely grab the commodity and place it into the shopping bag on the packaging table.

Additionally, the clearing module can collect the data information (amount, quantity and discount, etc.) of the purchased commodities that have been verified by the intelligent market clearing system, and generate an invoice for these items. It can also exchange data with the intelligent market automatic clearing APP software running in the shopper's smartphone so as to verify the clearing data.

The printing module can store the details of the purchased commodities and the clearing information into the intelligent market clearing system data cloud service platform, and subsequently print a receipt to the shopper.

In another aspect of the present invention, a NFC reading module, a location module, a communication module and a market anti-theft tag are provided in the shopping finger ring.

Furthermore, the NFC reading module is used to read the information of the electronic tag. The location module is used to calculate the position of a shopper who wears the shopping finger ring in the shopping mall. The communication module can communicate with the shopper's smartphone, and transmit the information of the commodity and the shopper's location to the intelligent market automatic clearing APP software.

The market anti-theft tag can remind the shopper to place the shopping finger ring in a specified location after use.

In another aspect of the present invention, the system comprises a display terminal, which can display the shopper's purchasing and clearing information, thereby allowing the shopper to compare this information with that recorded by the intelligent market automatic clearing APP software running in the smartphone.

In another aspect of the present invention, the system comprises a printing terminal for printing the shopping list and clearing list.

In another aspect of the present invention, the barcode and RFID recognition apparatus table is a transparent body, which is convenient for a barcode scanner to scan the barcodes.

In another aspect of the present invention, an advertising board is disposed on the housing of the intelligent market automatic clearing device.

Furthermore, another embodiment of the present invention discloses a clearing method, whereby a shopper uses the shopping finger ring or smartphone to close to the electronic price tag of a commodity to be purchased; the intelligent market automatic clearing APP software acquires and records the commodities selected by the shopper, and acquires related information from the intelligent market clearing system data cloud service platform so as to purchase the commodity in advance.

Additionally, the shopper uses the guiding function provided by the intelligent market automatic clearing APP software to select the needed commodities.

Subsequently, the shopper uses the online payment function provided by the intelligent market automatic clearing APP software to pay online or optionally choose door-to-door service; the intelligent market self-service clearing APP software storing the related information for the shopper to access at any time.

The shopper places the shopping basket with the selected commodities on the shopping basket moving frame of the market automatic clearing device, and places the smartphone or shopping finger ring on the clearing table of the market automatic clearing device; the system automatically verifies if the purchased commodities are in accordance with what the shopper is about to remove.

Additionally, the intelligent market clearing system data cloud service platform, the intelligent market automatic clearing APP software and the intelligent market clearing system checks and verifies the information of the commodities selected by the shopper, and informs the shopper to confirm the transaction.

Finally, the intelligent market clearing system informs the shopper to pay by card or cash after verification, and then prints the shopping list and clearing list to the shopper; the intelligent market clearing system automatically opens the automatic channel door, thereby completing the transaction.

In another embodiment of the present invention, the system can remind the staff to start a manual verifying process if any inconsistency is found during the clearing or verifying process.

Compared with the prior art, the present invention has the advantages of relieving management pressure and reducing the labor cost of the sales process.

The present invention realizes an unimpeded online and offline info-communication, providing clear benefits to the shopper. The APP software in the mobile terminal functions as a shopping guide for the shoppers, saving time and reducing the management cost of the market. In addition, the present invention provides the shoppers a channel to learn about the latest available offers and discounts.

Before purchasing, the shopper can retrieve information about the commodity (manufacture, date of production, ingredients, logistics, etc.) through the mobile terminal, realizing a preliminary clearing process which effectively reduces the return and exchange rate. Consequently, a more efficient shopping process is realized.

Furthermore, the present invention allows shoppers to buy commodities conveniently, relieving the clearing pressure of the market and reducing the time cost of the shoppers and market. Consequently, the number of shoppers can be increased and the attraction to the shoppers can be improved. More important, the shoppers' will be more satisfied with their shopping experience.

The present invention combines the electronic price tags, the mobile terminal and the intelligent automatic clearing system, realizing an integration of tracing commodity information, purchasing, automatic clearing and mobile payment which greatly promotes the development of mobile internet applications and internet of things networking that facilitates the circulation of electronic currency.

BRIEF DESCRIPTION OF THE DRAWINGS

To clearly expound the present invention or the technical solution, the drawings and embodiments are hereinafter combined to illustrate the present invention. Obviously, the drawings are merely some embodiments of the present invention and those skilled in the art can associate themselves with other drawings without paying creative labor.

FIG. 8 is a schematic diagram of the main interface of the intelligent market clearing APP software of the present invention.

FIG. 10 is a schematic diagram of the shopping functional interface of the intelligent market clearing APP software of the present invention.

MARKING INSTRUCTIONS OF THE DRAWINGS

101, Weighing Table; 102, Display Screen; 103, Camera; 104, Receipt Printing Port; 105, Commodity Data NFC Transmitting Area; 106, Commodity Selecting Area; 201, Shopping Basket; 202, Commodity; 203, Shopping Basket Horizontal Moving Table; 204, Shopping Basket Vertical Moving Table; 205, Visual Recognition Apparatus Camera; 206, Mechanical Picking Apparatus Horizontal Moving Table; 207, Mechanical Picking Arm; 208, Mechanical Picking Apparatus Vertical Moving Table; 209, Mechanical Packaging Apparatus Horizontal Moving Table; 210, Mechanical Packaging Arm; 211, Mechanical Packaging Apparatus Vertical Moving Table; 212, Clearing Charge Apparatus; 213, Clearing Printing Terminal; 214, Clearing Table Display Terminal; 215, Automatic Channel Door, 216, Packaging Table; 217, Barcode Scanner; 218, Barcode and RFID Recognition Apparatus Table; 220, Mechanical Picking Hand; 221, Mechanical Packaging Hand; 222, Self-service Cash Receiver; 301, NFC Data Communication Interface; 302, Finger Hole; 303 Selecting Button; 401, The First Feature Point; 402, The Second Feature Point; 403, Shopping Basket Handle; 501, NFC Data Perceiving Area; 502, Price Display Area; 503, Commodity Information Display Area

DETAILED DESCRIPTION OF THE INVENTION

Drawings and detailed embodiments are combined hereinafter to elaborate the technical principles of the present invention.

Figure 1:
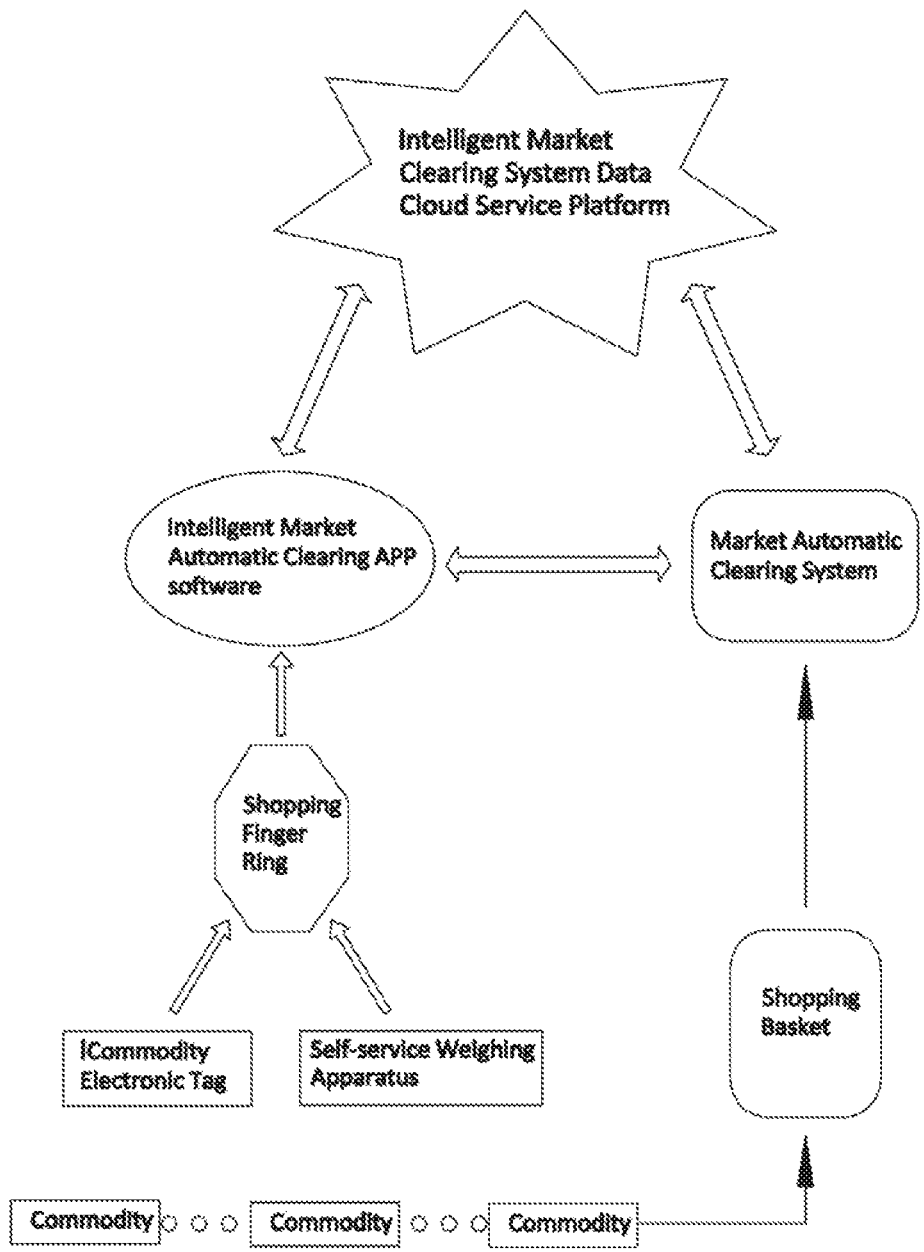
FIG. 1 is a structure diagram of the automatic clearing system of the present invention.

As shown in FIG. 1, the present invention provides an intelligent market automatic clearing system, using the commodity electronic tag as the medium and the shopper's smartphone or shopping finger ring as the tool to connect between the commodity information and the shopper's preferences. According to the intelligent market automatic clearing system, the automatic clearing of purchased commodities can be actuated.

An intelligent market automatic clearing system comprises a device part and a system part. The device part comprises commodity electronic price tags, a self-service weighing apparatus, a shopping finger ring, a mobile phone, a shopping basket and a market automatic clearing device. The system part comprises intelligent market automatic clearing APP software, an intelligent market clearing system and an intelligent market clearing system data cloud service platform. The market automatic clearing device comprises a shopping basket moving frame, a visual recognition apparatus, a mechanical commodity picking apparatus, a barcode and RFID recognition apparatus table, an anti-theft decoding apparatus, a mechanical packaging apparatus table, a clearing table, an anti-theft detection door and an automatic channel door.

The commodity electronic price tags are used to replace the traditional ones. A RFID near field communication electronic chip is disposed in the electronic price tag, allowing the information related to the commodity, including the manufacture, date of production, bar code, ingredients and price to be shown or written into the electronic chip. Moreover, the electronic chip can exchange information with a mobile phone running the intelligent market self-service clearing system APP software.

The mobile phone is the shopper's smartphone, having functions of wireless near field communication, NFC communication, Bluetooth communication or WI-FI communication.

The shopping finger ring is a device provided by the market for helping the shopper to realize a self-service shopping, which can acquire the information of commodities selected by the shopper and the shopper's locating information, and transmit the information of commodities to the intelligent market automatic clearing APP software running in the shopper's smart phone. A NFC reading module, a location module, a communication module and a market anti-theft tag are provided in the shopping finger ring. The NFC reading module is used to read the information of the electronic tag. The location module is used to calculate the position of a shopper who wears the shopping finger ring in the shopping mall. The communication module can communicate with the shopper's smartphone, and transmit the commodity information and the shopper's location to the intelligent market automatic clearing APP software. The market anti-theft tag can remind the shopper to place the shopping finger ring to a specified location after use.

The self-service weighing apparatus allows the shopper to weigh the selected commodities by herself, and print the barcode receipts that need to be attached to the commodities. Additionally, the weighing apparatus can also exchange information with the shopper's smartphone running the intelligent market self-service clearing system APP software.

A plurality of visual recognition apparatuses is disposed in the shopping basket, which can rapidly and precisely locate the commodities in the shopping basket and calculate the recognition feature points of the commodity's outline.

The shopping basket is disposed on the shopping basket moving frame. A vertical moving shaft and a horizontal moving shaft are disposed on the shopping basket moving frame, propelling the shopping basket to move vertically and horizontally.

The mechanical commodity picking apparatus comprises a mechanical picking arm and a mechanical picking hand. The mechanical picking arm can move horizontally and vertically, enabling the mechanical picking hand to grab the commodities in the shopping basket, and place the commodities onto the barcode and RFID recognition apparatus table. The mechanical picking hand, which is disposed in the mechanical picking arm for grabbing a commodity, can be switched on and off. The terminal of the mechanical picking hand is provided with a touch sensor, a suction cup and a plurality of mechanical picking fingers, wherein the touch sensor can recognize a commodity and the suction cup can reliably grab a commodity, and the plurality of mechanical picking fingers can be used to flexibly coordinate the grabbing motions.

The visual recognition apparatus can scan the commodities in the shopping basket, and the laser location and radar location can be combined to calculate the shape and the location of each commodity according to the scan results.

Consequently, the shopping basket moving frame and the mechanical picking arm can be instructed to move correspondingly.

A plurality of 360 degree omni-directional scanners is disposed on the barcode and RFID recognition apparatus table for scanning the barcode information of the commodities placed thereon. The barcode and RFID recognition apparatus table is a transparent body, which is convenient for a scanner to scan the barcodes. An electronic scale is disposed on the barcode and RFID recognition apparatus table, which can compare the weight of a commodity with the corresponding barcode in the system so as to further verify the commodity. A RFID reader is disposed on the barcode and RFID recognition apparatus table for automatically recognizing the commodity having a RFID tag.

The anti-theft decoding apparatus, which is disposed on the barcode and RFID recognition apparatus table, can be used to decode the commodity having an anti-theft tag.

The mechanical packaging apparatus table comprises a mechanical packaging arm, a packaging mechanical hand and a packaging table. The mechanical packaging arm can move horizontally and vertically, allowing the mechanical packaging hand to grab the commodities placed on the barcode and RFID recognition apparatus table, and further place them into a shopping bag on the packaging table. The mechanical packaging hand, which is disposed in the mechanical packaging arm for grabbing a commodity, can be switched on and off. A touch sensor, a suction cup and a plurality of mechanical packaging fingers are disposed in the terminal of the mechanical packaging hand, wherein the touch sensor can perceive a commodity and the suction cup can reliably grab a commodity, and the mechanical packaging fingers can flexibly coordinate the grabbing motions. The packaging table is for placing the shopping bags and packaging the commodities purchased by the shopper.

The clearing table comprises a clearing charge apparatus, a printing terminal, a display terminal and a self-service cash receiver, which can verify the clearing information with the intelligent market automatic clearing APP software through the non-contact NFC technology, Bluetooth WI-FI communication technology, or human communication technology. The display terminal can show the shopper's shopping list, allowing the shopper to conveniently verify the details of commodities with the intelligent market automatic clearing APP software. The shopper can purchase the selected commodities by bankcard or membership card through the clearing charge apparatus, or pay cash through the self-service cash receiver. The printing terminal is used to print the shopping list and clearing statement.

The anti-theft detection door, which is disposed at the location of the automatic channel door near the automatic clearing table, detect unpaid merchandise and informs the store attendant.

The automatic channel door can open automatically when the selected commodities are successfully purchased.

The intelligent market automatic clearing APP software can be connected to the WI-FI location, Bluetooth location or UWB location in the market through the shopper's smartphone or shopping finger ring so as to guide and service the shopper. According to the APP software, the information of the shopper's location and the commodities purchased by the shopper can be acquired and recorded, and the purchased commodities can be cleared online, allowing a shopper to trace the information of the purchased commodities, compare the prices online, and check reviews of other shoppers. The intelligent market automatic clearing APP software can accept online payment, credit card payment, cash payment or membership card quick payment according to the electronic shopping list generated by the software.

The intelligent market clearing system can exchange data with the intelligent market automatic clearing APP software and the intelligent market clearing system data cloud service platform, enabling the information of the selected commodities and the clearing information to be automatically verified. As well, a corresponding control instruction can be transmitted.

The intelligent market clearing system data cloud service platform can record the information of all commodities for sale in the system, exchanging data with the intelligent market automatic clearing APP software running in the shopper's smartphone in a real-time. It can also exchange data with the intelligent market clearing system in real-time and further check, record and analyze the shopper's purchasing behavior.

Figure 13:
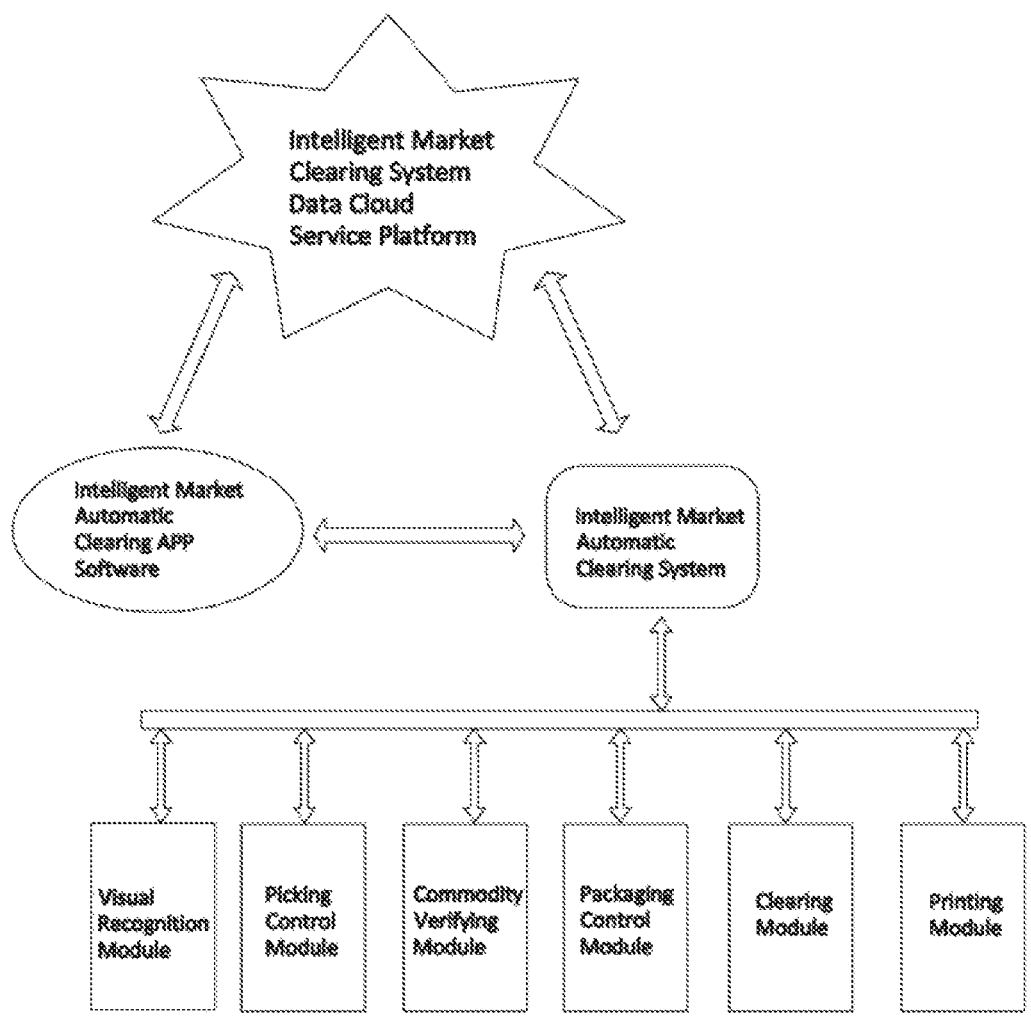
FIG. 13 is a schematic diagram of the functional modules of the intelligent market clearing system software of the present invention.

As shown in FIG. 13, the intelligent market clearing system software comprises a visual recognition module, a picking control module, a commodity verifying module, a packaging control module, a clearing module and a printing module.

Relying on the image recognition technology, the commodities in the shopping basket can be fuzzily recognized by the visual recognition module and compared with the model base in the system. Consequently, the overall physical dimension and the grabbing parameter of a commodity placed on the top layer of the shopping basket can be evaluated, and the clearing system can be informed to instruct the mechanical picking apparatus to grab the commodity.

The picking control module is used to control the shopping basket moving frame, the mechanical picking apparatus, the mechanical picking arm and the mechanical picking hand to move to the position of a commodity. By recognizing the information from the touch sensor disposed in the mechanical picking hand, the mechanical picking hand can be controlled to precisely grab a commodity and place the commodity on the barcode and RFID recognition apparatus table.

The commodity verifying module can record the commodities placed in the barcode and RFID recognition apparatus area, and exchange data with the intelligent market automatic clearing APP software running in the shopper's smartphone, acquiring the details of commodities purchased by the shopper and verifying the purchased commodities.

The packaging control module is used to control the mechanical packaging apparatus table, the mechanical packaging arm and the mechanical packaging hand to move to the position of a commodity placed on the barcode and RFID recognition apparatus table. Through recognizing the information from the touch sensor disposed in the mechanical packaging hand, the mechanical packaging hand can precisely grab the commodity place it into the shopping bag on the packaging table.

The clearing module can collect the data information (amount, quantity and discount, etc.) of the purchased commodities that have been verified by the intelligent market clearing system, and generate a shopping bill accordingly. It can also exchange data with the intelligent market automatic clearing APP software running in the shopper's smartphone so as to verify the clearing data.

The printing module can store the details of the purchased commodities and the clearing information into the intelligent market clearing system data cloud service platform and subsequently print a statement to the shopper.

Preferably, an advertising board is disposed on the housing of the intelligent market automatic clearing device.

Figure 7:
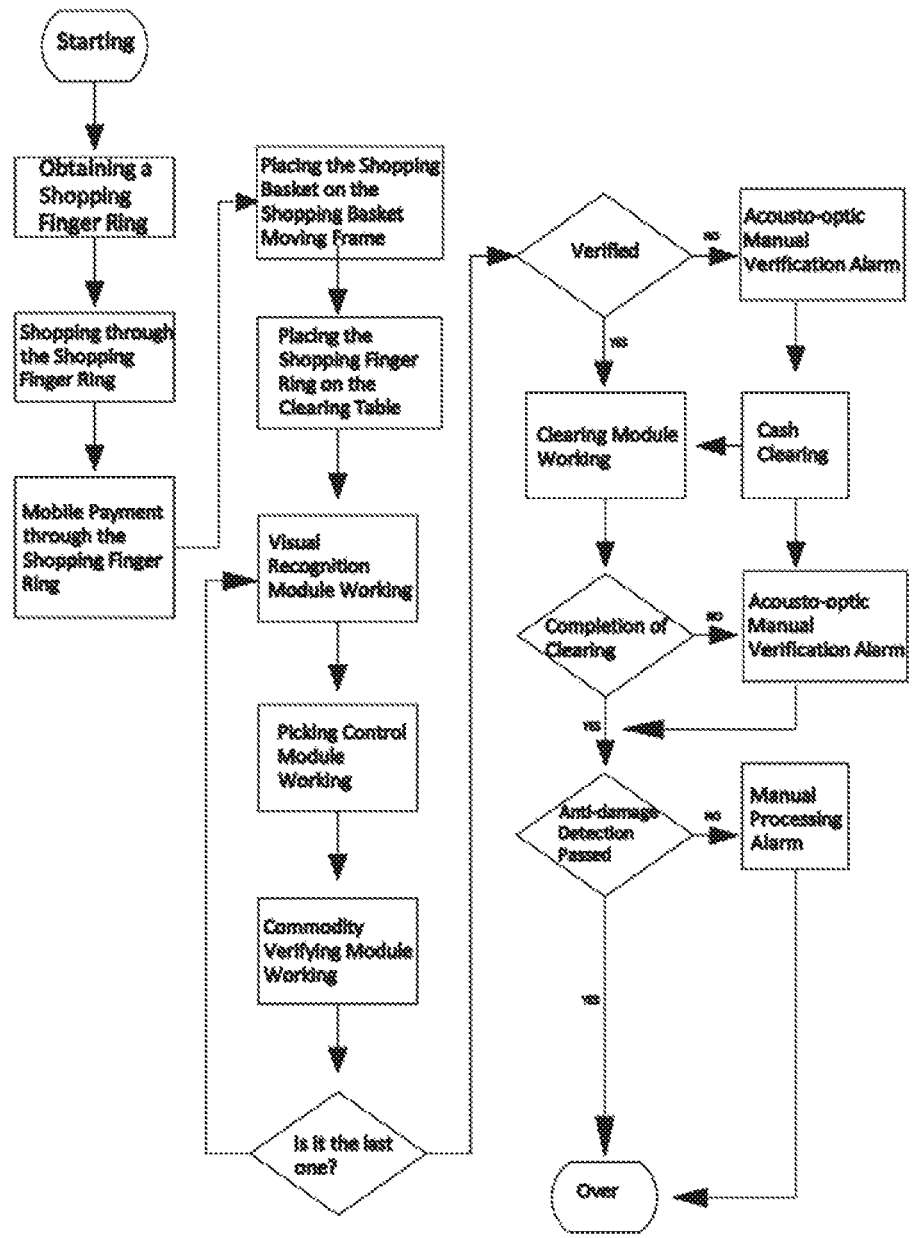
FIG. 7 is a workflow diagram of the intelligent market clearing system of the present invention.

FIG. 7 shows the automatic clearing method of the present invention, wherein when entering the intelligent market with a smartphone for the first time, the shopper can turn on the WI-FI function of the smartphone, and the intelligent market automatic clearing system data cloud service platform can automatically guide the shopper to install the intelligent market automatic clearing APP software in the smartphone. After installing the software, the shopper can purchase commodities in the market through the APP software.

The shopper whose smartphone has already installed the APP software can get the shopping finger ring and enter the market directly. The system provides the shopper two shopping methods: one is to communicate with the commodity electronic price tag through the smartphone, acquiring the information of selected commodities and recording the location information of the smartphone into the intelligent market automatic clearing system APP software, and the other is to acquire the information of selected commodities through the shopping finger ring, recording the location information of the shopping finger ring into the intelligent market automatic clearing system APP software. The shopper's smartphone can directly communicate with the commodity electronic price tag through the NFC function of the smartphone. The information of the electronic commodity price tag can also be transferred to the smartphone through the shopping finger ring having NFC function, Bluetooth or WI-FI function. Additionally, the communication between the smartphone and the commodity electronic price tag can be realized through human communication (human communication module is required to be installed in both the electronic price tag and the smartphone). The shopper's locating information can be recorded into the intelligent market automatic clearing system APP software through the WI-FI or Bluetooth locating function of the smartphone, or through the WI-FI, Bluetooth or UWB locating function of the shopping finger ring.

Figure 3:
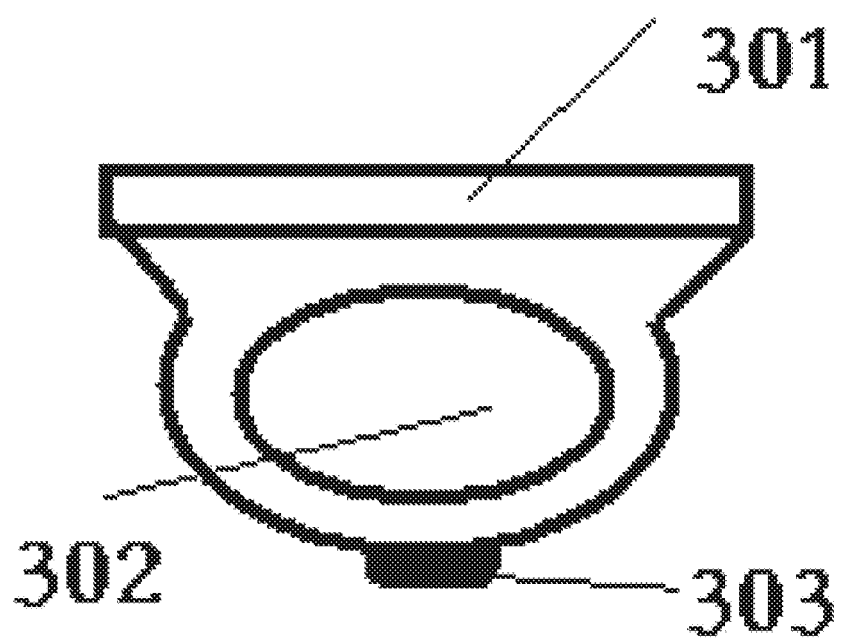
FIG. 3 is a structure diagram of the shopping finger ring of the present invention.
Figure 5:
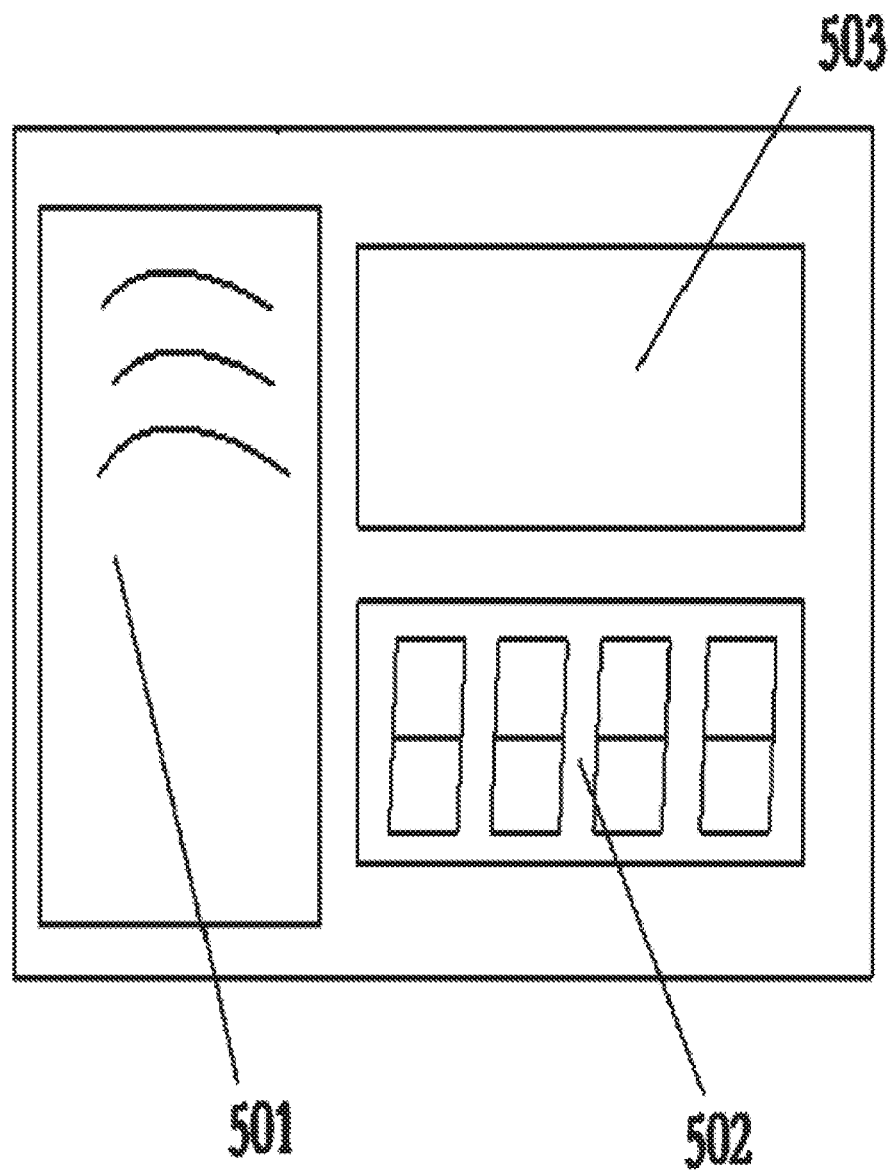
FIG. 5 is a structure diagram of the commodity electronic tag of the present invention.

As shown in FIGS. 3, 5 and 8, the shopper can put a finger into the finger hole 302 when selecting a commodity, using the NFC data communication surface 301 of the shopping finger ring in close proximity to the NFC data perceiving area 501 of the commodity electronic price tag. When the selecting button 303 of the shopping finger ring is pressed, the commodity information and locating information can be transmitted to the matched smartphone through WI-FI or Bluetooth. The related information can be displayed on the main interface of the intelligent market automatic clearing APP software. The commodity electronic price tag also comprises a price display area 502 and a commodity information display area 503.

Figure 2:
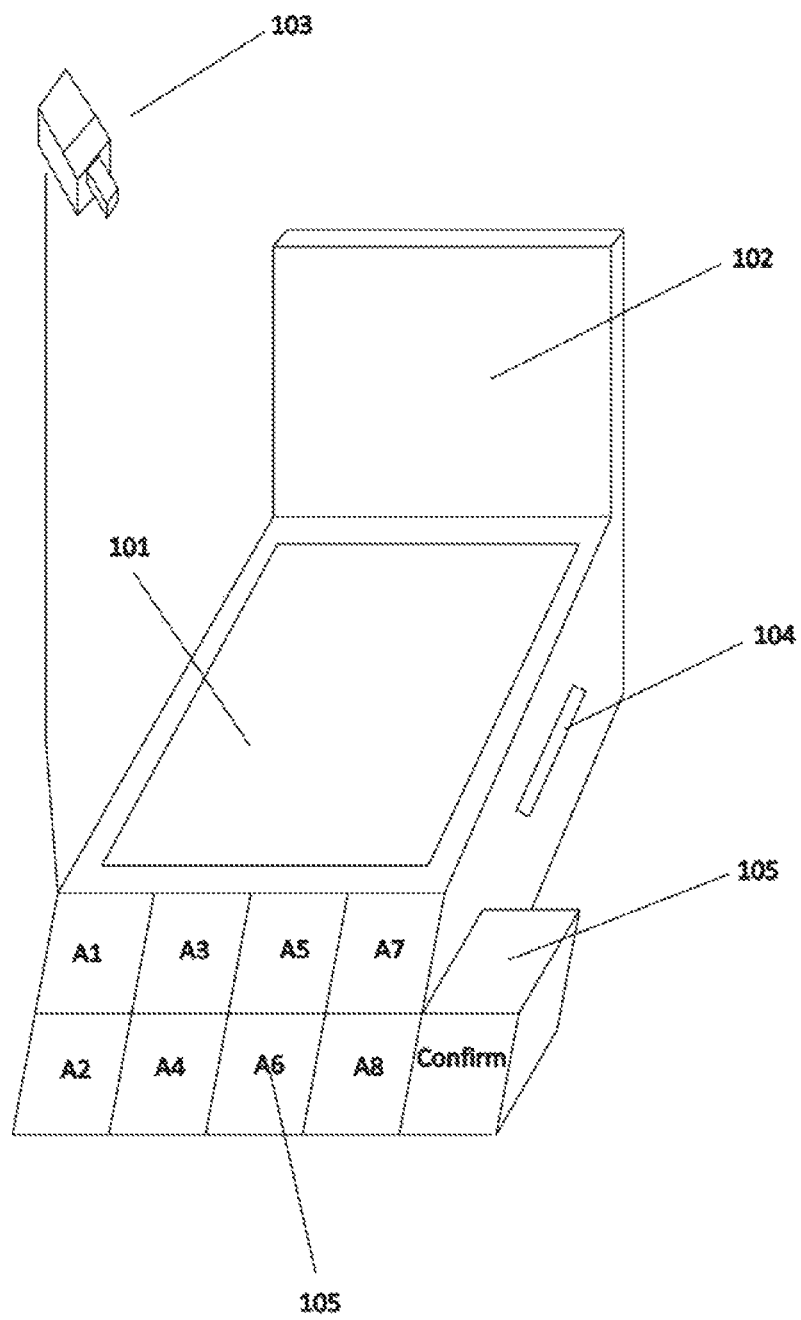
FIG. 2 is a structure diagram of the self-service weighing apparatus of the present invention.

As shown in FIGS. 2, 3, and 8, the shopper can place the commodity on the self-service weighing apparatus 101 when a selected commodity needs to be weighed, and selects the commodity in commodity selecting area 106. The camera 103 can scan the commodity and show the information in the display screen 102. Subsequently, the shopper can use the NFC data communication surface 301 of the shopping finger ring in close proximity to the commodity data NFC transmitting area 105, and the self-service weighing apparatus automatically print the barcode receipt of the commodity. The shopper can retrieve the barcode receipt from the printing port 104 and attach it to the packaging bag of the commodity, thereby completing the self-service weighing process. The shopping finger ring can transmit the commodity information and location information to the corresponding smartphone through WI-FI or Bluetooth, and the related information can be immediately displayed in the main interface of the intelligent market automatic clearing APP software.

Figure 9:
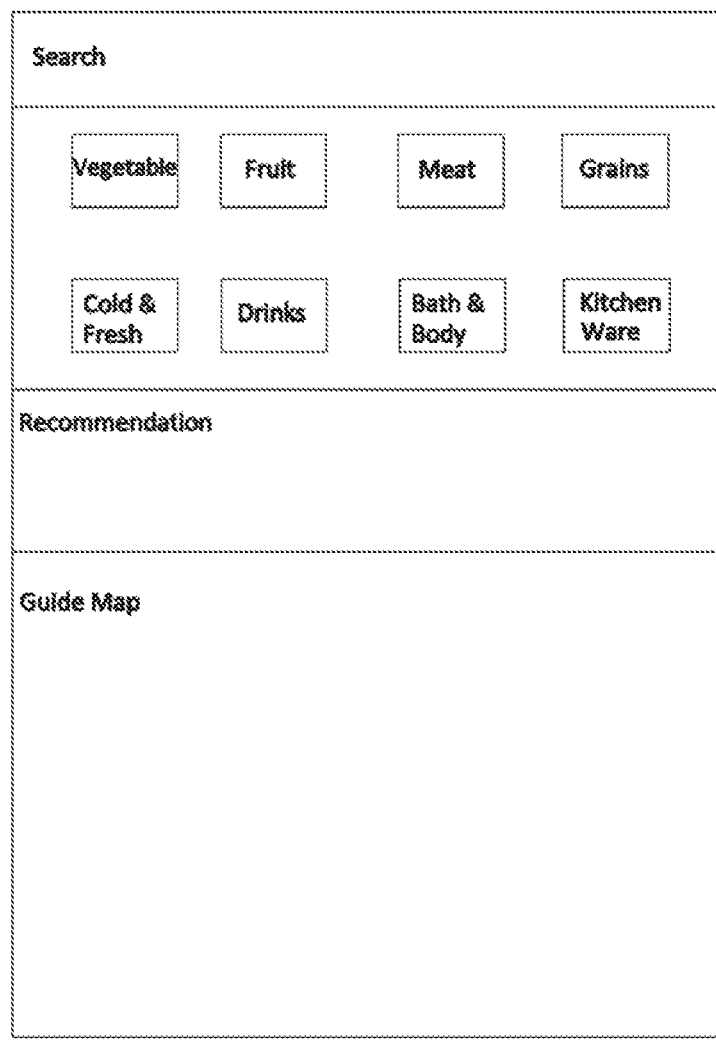
FIG. 9 is a schematic diagram of the guiding functional interface of the intelligent market clearing APP software of the present invention.

As shown in FIG. 9, the shopper can quickly find what he wants through the guiding interface of the intelligent market automatic clearing APP software.

Figure 10:
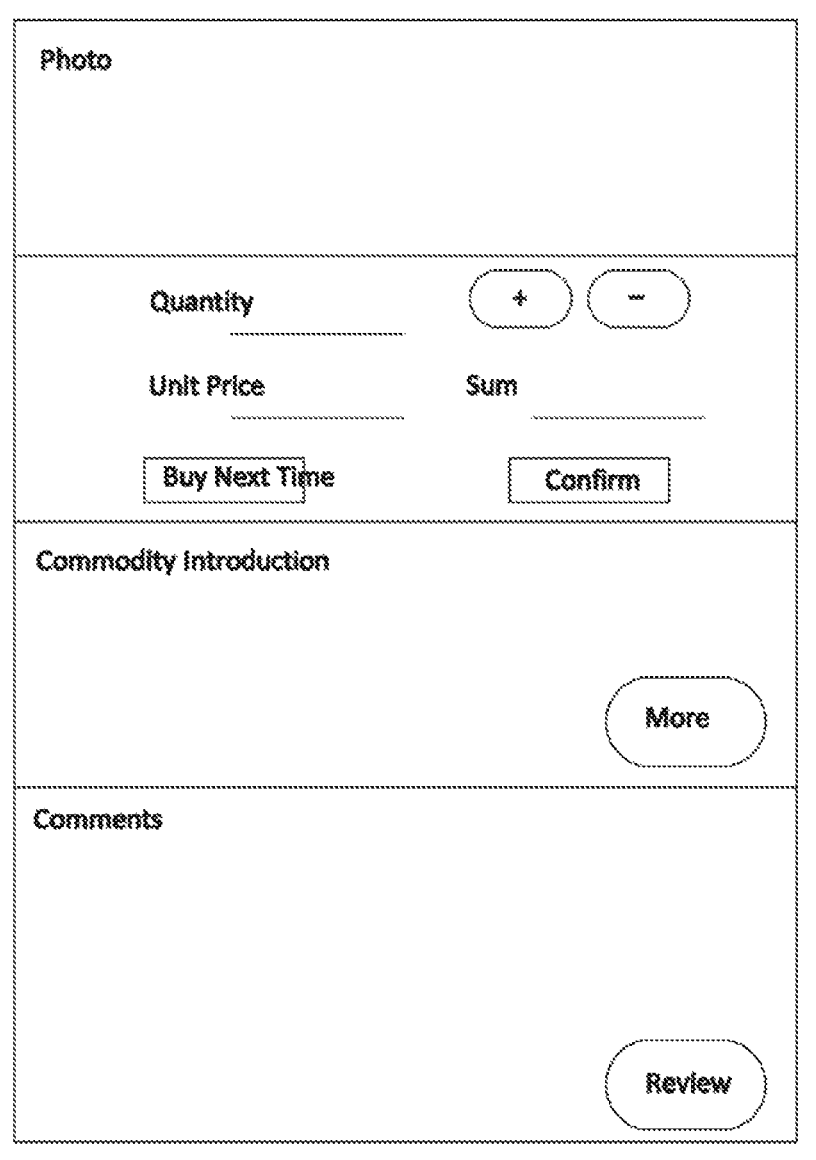

As shown in FIG. 10, the shopper can check the commodity information through the shopping interface of the intelligent market automatic clearing APP software. The shopper can also compare the price online and review the commodity.

Figure 11:
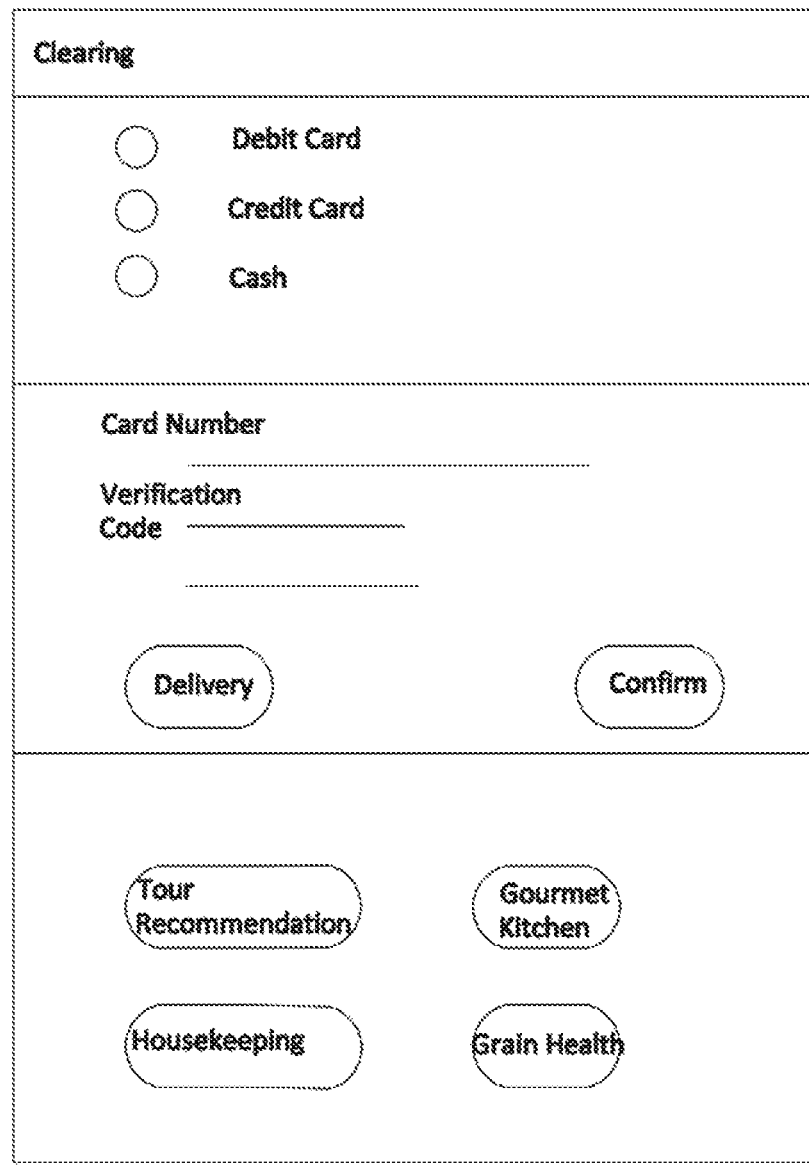
FIG. 11 is a schematic diagram of the clearing functional interface of the intelligent market clearing APP software of the present invention.
Figure 12:
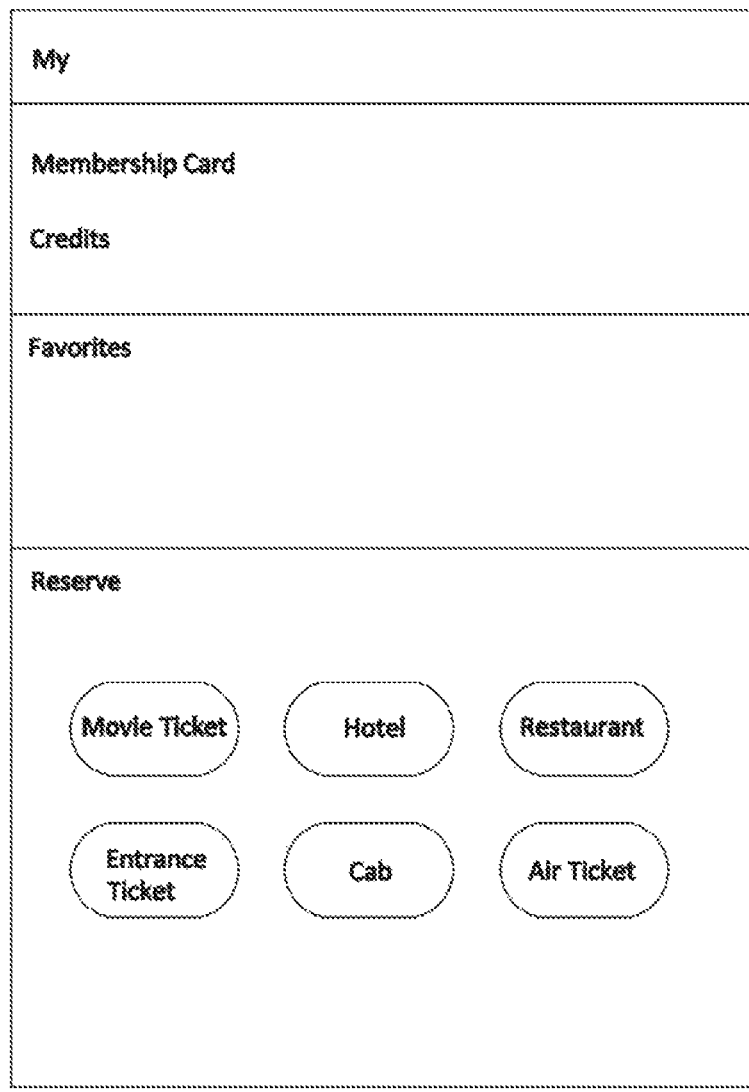
FIG. 12 is a schematic diagram of other functional interface of the intelligent market clearing APP software of the present invention.

As shown in FIG. 11, the shopper can pay the selected commodities online and choose door-to-door service through the clearing interface of the intelligent market automatic clearing APP software.

Figure 6:
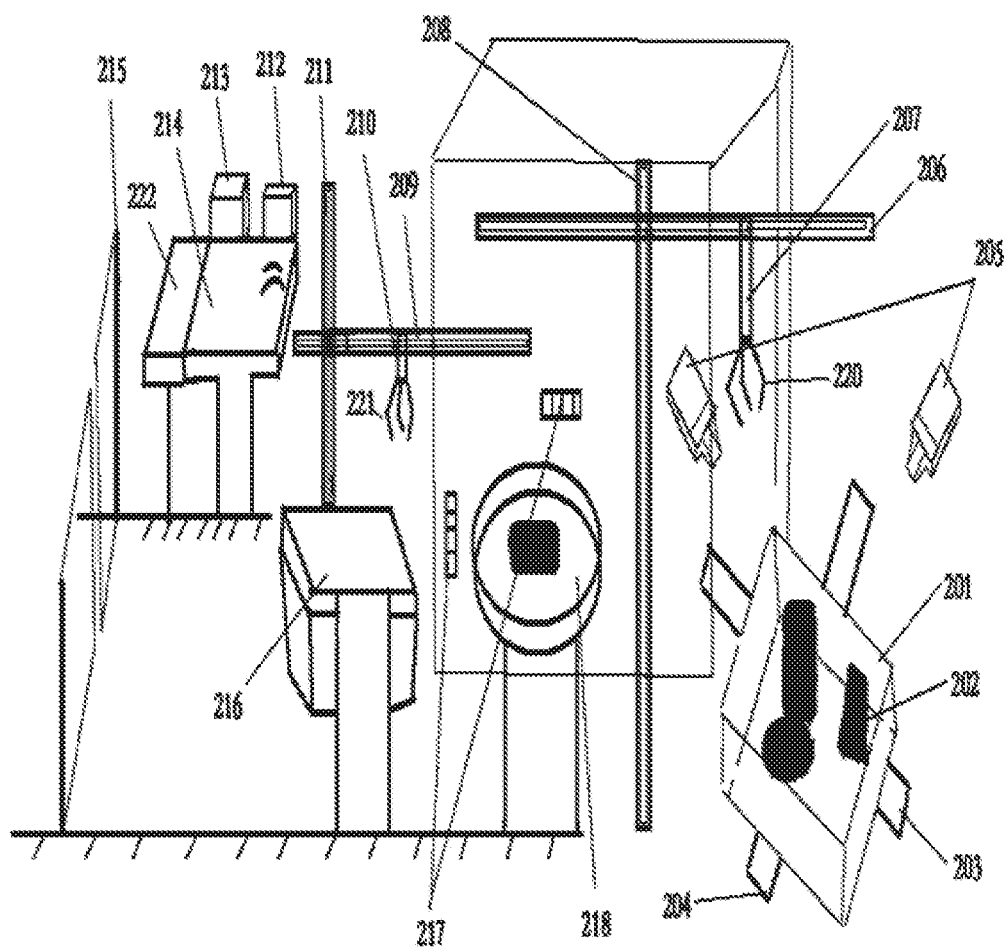
FIG. 6 is a structure diagram of the market automatic clearing device of the present invention.

As shown in FIG. 6, the shopper can place a plurality of commodities 202 into the shopping basket 201.

After selecting the commodities, the shopper can place the shopping basket 201, having the selected commodities on the shopping basket moving table composed of the shopping basket horizontal moving table 203 and the shopping basket vertical moving table 204. Subsequently, the shopper can place the shopping finger ring (or smartphone having the NFC function) onto the clearing charge apparatus 212 of the clearing table. The intelligent market clearing device automatically verifies the information of commodities in the shopping basket with that recorded by the intelligent market automatic clearing APP software running in the shopper's smartphone, and places the commodities into the shopping bag on the packaging table 216.

Figure 4:
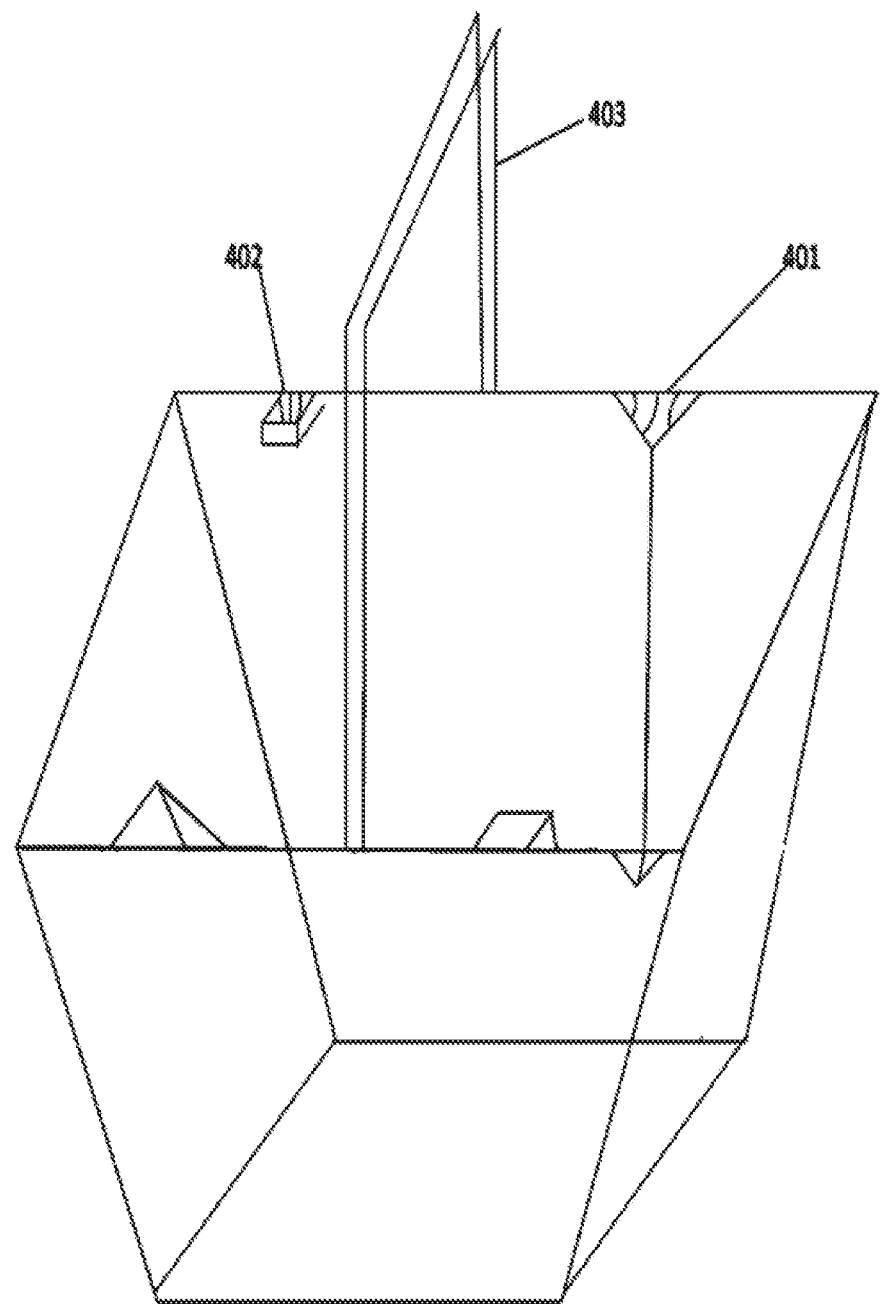
FIG. 4 is a structure diagram of the shopping basket of the present invention.

The intelligent market automatic clearing system verifies the information of the commodities in the shopping basket with that recorded by the intelligent market automatic clearing APP software through the intelligent market automatic clearing device. As shown in FIGS. 4, 6 and 13, the steps comprising:

By lifting the shopping basket handle 403, the shopper can place the shopping basket 201 having commodities 202 onto the shopping basket horizontal moving table 203 and the shopping basket vertical moving table 204, and the visual recognition module starts to work at the same time. The visual recognition apparatus camera 205 can recognize the first feature point 401 and the second feature point 402 on the shopping basket so that the locating information of the shopping basket 201 corresponding to the mechanical picking hand 220 can be confirmed. Relying on the image recognition technology, the commodities 202 in the shopping basket can be fuzzily recognized by the visual recognition module and compared with the model base in the system. Consequently, the overall physical dimension and the grabbing parameter of a commodity in the shopping basket can be evaluated, and the picking control module can be informed to grab the commodity.

According to the first feature point 401, the second feature point 402 and the locating information of the commodities, the picking control module of the intelligent market automatic clearing system can propel the shopping basket horizontal moving table 203, the shopping basket vertical moving table 204, the mechanical picking apparatus horizontal moving table 206 and the mechanical picking apparatus vertical moving table 208 to move to an optimum location. The mechanical picking arm 207 can lead the mechanical picking hand 220 to grab the commodity in the basket, and the picking control module propels the mechanical picking apparatus horizontal moving table 206 and the mechanical picking apparatus vertical moving table 208 to move the mechanical picking hand grabbing a commodity to the barcode and RFID recognition apparatus table 218. When the mechanical picking hand is open, the commodity can be placed onto the barcode and RFID recognition apparatus table 218.

After that, the commodity verifying module of the intelligent market automatic clearing system starts to work. The barcode on the barcode and RFID recognition apparatus table 218 can be scanned by the barcode scanner 217 and recorded into the intelligent market automatic clearing system. The RFID reader, which is disposed on the barcode and RFID recognition apparatus table 218, can recognize the commodity having an electronic tag. The barcode and RFID recognition apparatus table 218 can rotate, and the bearing surface of the barcode and RFID recognition apparatus table 218 is transparent, enabling the barcode scanner 217 to scan in 360 degree. The anti-theft decoding apparatus is disposed on the barcode and RFID recognition apparatus table 218 for decoding the commodity having an anti-theft tag.

After scanning, the packaging control module of the intelligent market automatic clearing system is initiated, propelling the mechanical packaging apparatus horizontal moving table 209 and the mechanical packaging apparatus vertical moving table 211 to move, leading the mechanical packaging arm 210 and the mechanical packaging hand 221 to move to the location of the commodity 202 on the barcode and RFID recognition apparatus table 218 and grab the commodity 202. Subsequently, the packaging control module can propel the mechanical packaging apparatus horizontal moving table 209 and the mechanical packaging apparatus vertical moving table 211 to move the mechanical packaging hand 221 to grab the commodity 202 to the packaging table 216. When the mechanical packaging hand 221 is open, the commodity 202 can be placed into the shopping bag on the packaging table 216.

The intelligent market automatic clearing system can automatically cycle until all of the commodities 202 in the shopping basket 201 have been placed into the shopping bag on the packaging table 216.

Subsequently, the clearing module of the intelligent market automatic clearing system is initiated, verifying if the information of commodities in the shopping basket corresponds with that recorded by the intelligent market automatic clearing APP software running in the shopper's smartphone. Meanwhile, the shopper has purchased the selected commodities through the clearing functional interface of the APP software so that the clearing information can be shown in the display terminal 214 of the clearing table.

Once the shopper failed to purchase the selected commodities through the clearing functional interface of the APP software, and the intelligent market automatic clearing system has verified the information of the commodities in the shopping basket and that recorded by the intelligent market automatic clearing APP software running in the shopper's smartphone, the shopper can select to pay by bankcard or membership card through the clearing charge apparatus 212, or pay cash through the self-service cash receiver. The clearing information can also be shown in the display terminal 214 of the clearing table.

After verification by the shopper, the printing module of the intelligent market clearing system is initiated, printing the shopping list and clearing statement to the shopper through the printing terminal 213. The automatic channel door 215 is open and the shopper can leave the market with the purchased commodities.

The intelligent market automatic clearing system and the intelligent market clearing system data cloud service platform can record the commodity information and clearing information recorded by the intelligent market automatic clearing APP software running in the shopper's smartphone.

The shopper can also select an alternate functional interface of the intelligent market automatic clearing APP software for shopping.

The system can remind the staff to manually verify if any inconsistencies are found during the clearing or verifying process.

When the shopper passes the automatic channel door 215, the anti-theft detection door starts to function, which can alarm the unpaid commodities and inform the staff to start a manual verifying process.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. An intelligent market automatic clearing system, comprising:
a device part, and
a system part;
wherein the device part further comprising commodity electronic price tags, a self-service weighing apparatus, a shopping finger ring, a mobile phone, a shopping basket and a market automatic clearing device;
wherein the system part further comprising an intelligent market automatic clearing APP software, an intelligent market clearing system and an intelligent market clearing system data cloud service platform;
wherein the market automatic clearing device further comprising a shopping basket moving frame, a visual recognition apparatus, a mechanical commodity picking apparatus, a barcode and RFID recognition apparatus table, an anti-theft decoding apparatus, a mechanical packaging apparatus table, a clearing table, an anti-theft detection door and an automatic channel door; wherein a RFID near field communication electronic chip is disposed in an electronic price tag, storing information related to the commodity; wherein the electronic chip is capable of exchanging information with the mobile phone running the intelligent market self-service clearing system APP software; wherein the mobile phone is capable of conducting wireless near field communication, NFC communication, Bluetooth communication or WI-FI communication; wherein the shopping finger ring is capable of acquiring information of commodities selected by the shopper and shopper's locating information, and transmitting the information of commodities to the intelligent market automatic clearing APP software running in the mobile phone; wherein the self-service weighing apparatus is capable of weighing selected commodities, and printing barcode receipts that need to be attached on the commodities; wherein the self-service weighing apparatus is also capable of exchanging information with the mobile phone running the intelligent market self-service clearing system APP software; wherein a plurality of visual recognition apparatuses is disposed in the shopping basket, which is capable of locating the commodities in the shopping basket and calculate recognition feature points of a commodity's outline; wherein the shopping basket is disposed on a shopping basket moving frame; wherein a vertical moving shaft and a horizontal moving shaft are disposed on the shopping basket moving frame, propelling the shopping basket to move vertically and horizontally;

wherein the mechanical commodity picking apparatus further comprising a mechanical picking arm and a mechanical picking hand; wherein the mechanical picking arm is capable of moving horizontally and vertically, enabling the mechanical picking hand to grab the commodity in the shopping basket, and place the commodity on the barcode and RFID recognition apparatus table; wherein the mechanical picking hand, which is disposed in the mechanical picking arm for grabbing a commodity, is capable of being switched on and off; wherein the terminal of the mechanical picking hand is provided with a touch sensor, a suction cup and a plurality of mechanical picking fingers; wherein the touch sensor can recognize a commodity and the suction cup can grab a commodity, and the plurality of mechanical picking fingers is capable of being used to coordinate the grabbing motions; wherein the visual recognition apparatus can scan the commodities in the shopping basket, and a laser location and radar location is capable of being combined to calculate shape and location of each commodity according to scan results; wherein the shopping basket moving frame and the mechanical picking arm is capable of being instructed to move correspondingly; wherein a plurality of 360 degree omni-directional scanners is disposed on the barcode and RFID recognition apparatus table for scanning the barcode information of the commodities placed thereon; wherein the barcode and RFID recognition apparatus table is a transparent body; wherein an electronic scale is disposed on the barcode and RFID recognition apparatus table, capable of comparing weight of a commodity corresponding to the barcode in the system; wherein a RFID reader is disposed on the barcode and RFID recognition apparatus table for automatically recognizing commodity having a RFID tag; wherein the anti-theft decoding apparatus, which is disposed on the barcode and RFID recognition apparatus table, is capable of being used to decode commodity having an anti-theft tag; wherein the mechanical packaging apparatus table further comprising a mechanical packaging arm, a packaging mechanical hand and a packaging table; wherein the mechanical packaging arm is capable of moving horizontally and vertically, causing the mechanical packaging hand to grab the commodity placed on the barcode and RFID recognition apparatus table, and placing them into a shopping bag on the packaging table; wherein the mechanical packaging hand, which is disposed in the mechanical packaging arm for grabbing a commodity, is capable of being switched on and off; wherein a touch sensor, a suction cup and a plurality of mechanical packaging fingers are disposed in the terminal of the mechanical packaging hand; wherein the touch sensor is capable of perceiving a commodity and the suction cup capable of grabbing the commodity, and the mechanical packaging fingers are capable of coordinating the grabbing motions; wherein the packaging table is used for placing shopping bags and packaging commodities purchased by the shopper; wherein the clearing table further comprising a clearing charge apparatus and a self-service cash receiver, capable of verifying clearing information with the intelligent market automatic clearing APP software through the non-contact NFC technology, Bluetooth WI-FI communication technology; wherein the shopper pays the selected commodities by bankcard or membership card using the clearing charge apparatus, or pays cash using the self-service cash receiver, or pays on-line; wherein the anti-theft detection door, which is disposed at location of the automatic channel door near the automatic clearing table, is used to sound an alarm when unpaid commodities are detected; wherein the automatic channel door opens automatically when the selected commodities are successfully purchased; wherein the intelligent market automatic clearing APP software is capable of being connected to the WI-FI location, Bluetooth location or ultra-wide band location in the market through the shopper's smartphone or shopping finger ring so as to guide and service the shopper; wherein according to the APP software, the shopper's location information and information of the commodities purchased by the shopper is capable of being acquired and recorded, and the purchased commodities is capable of being cleared online, allowing the shopper to trace the information of the purchased commodities; wherein the intelligent market automatic clearing APP software is capable of accepting online payment, credit card payment, cash payment or membership card quick payment according to an electronic shopping list generated by the software; wherein the intelligent market clearing system is capable of exchanging data with the intelligent market automatic clearing APP software and the intelligent market clearing system data cloud service platform, enabling the information of the selected commodities and the clearing information to be automatically verified; wherein a control instruction is capable of being sent correspondingly; wherein the intelligent market clearing system data cloud service platform is capable of recording the information of all commodities for sale in the system, and exchange data with the intelligent market automatic clearing APP software running in the shopper's smartphone in real-time; wherein the intelligent market clearing system data cloud service platform exchanges data with the intelligent market clearing system in real-time and further check, record and analyze the shopper's purchasing behavior.

2. The intelligent market automatic clearing system of claim 1, wherein the intelligent market clearing system software comprises a visual recognition module, a picking control module, a commodity verifying module, a packaging control module, a clearing module and a printing module; wherein relying on an image recognition technology, the commodities in the shopping basket is capable of being recognized by the visual recognition module and compared with a model base in the system; wherein an overall physical dimension and a grabbing parameter of a commodity placed on a top layer of the shopping basket is capable of being evaluated, and the clearing system is capable of being informed to instruct the mechanical picking apparatus to grab the commodity; wherein the picking control module is used to direct the shopping basket moving frame, the mechanical picking apparatus, the mechanical picking arm and the mechanical picking hand to the position of a commodity; wherein by recognizing the information from the touch sensor disposed in the mechanical picking hand, the mechanical picking hand is capable of being instructed to precisely grab a commodity and place it on the barcode and RFID recognition apparatus table; wherein the commodity verifying module is capable of recording the commodities placed in the barcode and RFID recognition apparatus area, exchange data with the intelligent market automatic clearing APP software running in the shopper's smartphone, acquire the details of commodities purchased by the shopper, and verify the purchased commodities; wherein the packaging control module instructs the mechanical packaging apparatus table, the mechanical packaging arm and the mechanical packaging hand to move to the position of a commodity placed on the barcode and RFID recognition apparatus table; wherein by recognizing the information from the touch sensor disposed in the mechanical packaging hand, the commodity is capable of being precisely grabbed by the mechanical packaging hand and placed into the shopping bag on the packaging table; wherein the clearing module is capable of collecting the data information, including the purchased commodity's amount, quantity and discount, etc. that have been verified by the intelligent market clearing system, and generate a specific shopping list; wherein the clearing module is capable of exchanging data with the intelligent market automatic clearing APP software running on the shopper's smartphone to verify the clearing data; wherein the printing module is capable of storing the details of the purchased commodities and the clearing information into the intelligent market clearing system data cloud service platform and subsequently print a receipt to the shopper.

3. The intelligent market automatic clearing system of claim 1, wherein a NFC reading module, a location module, a communication module and a market anti-theft tag are disposed in the shopping finger ring; wherein the NFC reading module reads the information of an electronic tag; wherein the location module calculates the position of a shopper who wears the shopping finger ring in the market; wherein the communication module communicates with the shopper's smartphone, and transmit the commodity information and the shopper's location to the intelligent market automatic clearing APP software; wherein the market anti-theft tag reminds the shopper to place the shopping finger ring to a specified location after use.

4. The intelligent market automatic clearing system of claim 1, wherein the system further comprising a display terminal, which is capable of displaying a shopper's purchasing and clearing information.

5. The intelligent market automatic clearing system of claim 1, wherein the system further comprising a printing terminal for printing the shopping list and clearing statement.

6. The intelligent market automatic clearing system of claim 1, wherein the barcode and RFID recognition apparatus table is a transparent body.

7. The intelligent market automatic clearing system of claim 1, wherein an advertising board is disposed on an housing of the intelligent market automatic clearing device.

8. An intelligent market clearing method, comprising:
a) a shopper using a shopping finger ring or smartphone in proximity to an electronic price tag of a commodity to be purchased; an intelligent market automatic clearing APP software acquiring and recording commodities selected by the shopper and acquiring related information from an intelligent market clearing system data cloud service platform to purchase the commodity in advance;
b) the shopper using a guiding function provided by the intelligent market automatic clearing APP software to select commodities from the commodities selected by the shopper;
c) the shopper using an online payment function provided by the intelligent market automatic clearing APP software to pay online or choose door-to-door service; the intelligent market self-service clearing APP software storing related information for the shopper to access at any time;
d) the shopper placing a shopping basket with the selected commodities on a shopping basket moving frame of the market automatic clearing device, and placing the smartphone or shopping finger ring onto a clearing table of a market automatic clearing device; a system automatically verifying if purchased commodities are in accordance with what the shopper is about to remove;
e) an intelligent market clearing system data cloud service platform, the intelligent market automatic clearing APP software and the intelligent market clearing system checking and verifying the information of the commodities selected by the shopper, and informing the shopper to confirm;
f) an intelligent market clearing system informing the shopper to pay by card or cash after verification, and subsequently printing a shopping list and clearing statement to the shopper; the intelligent market clearing system automatically opening an automatic channel door, indicating that shopping processes has concluded.

9. The intelligent market clearing method of claim 8, wherein the system instructs a staff to manually verify inconsistency found during the clearing process or verifying process.

* * * * *